June 24, 1958  W. ADAMS  2,840,784
METHOD OF TESTING ELECTRICAL DEVICES
Filed Dec. 1, 1953  3 Sheets-Sheet 1
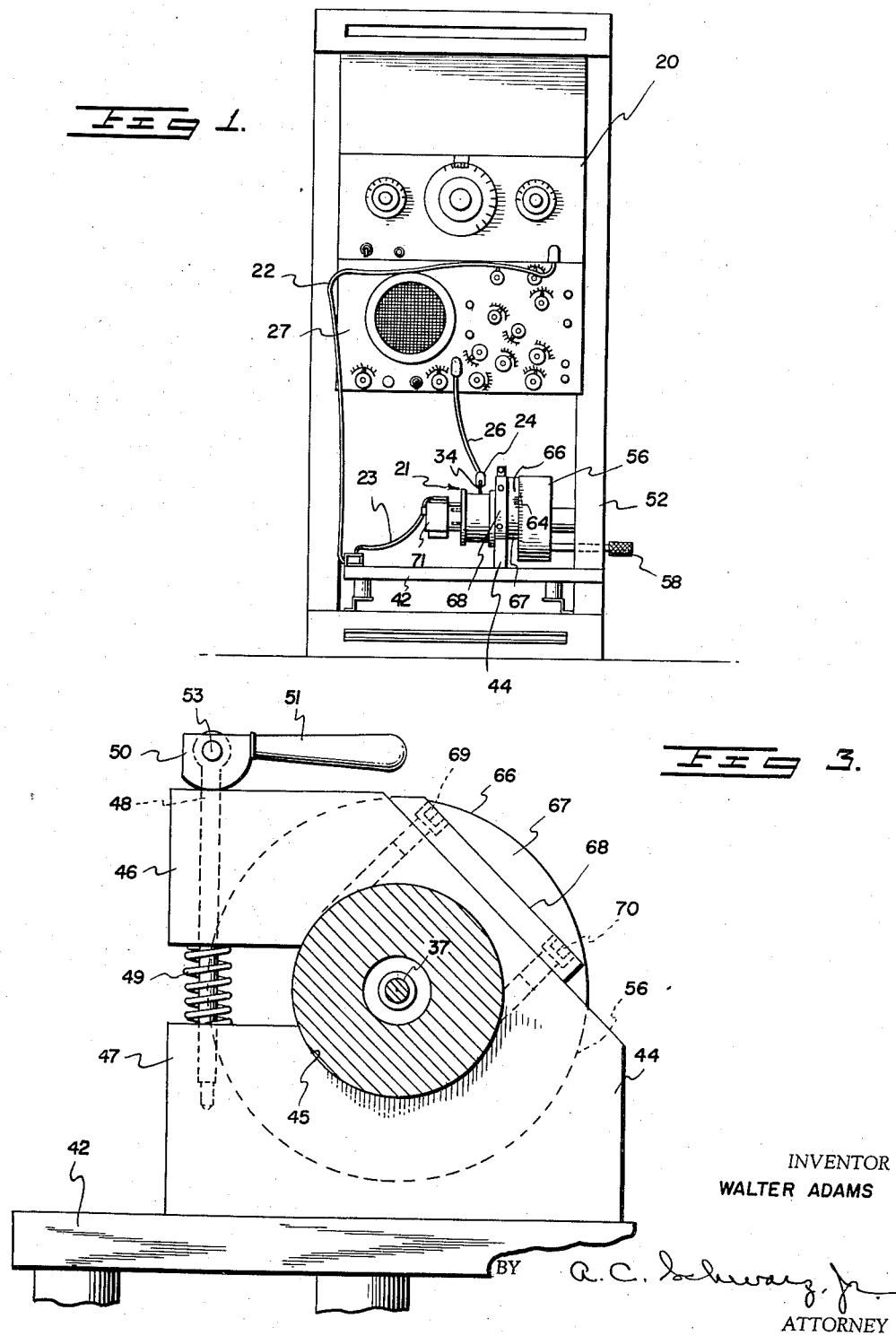
INVENTOR
WALTER ADAMS
BY
ATTORNEY June 24, 1958  W. ADAMS  2,840,784
METHOD OF TESTING ELECTRICAL DEVICES
Filed Dec. 1, 1953  3 Sheets-Sheet 2
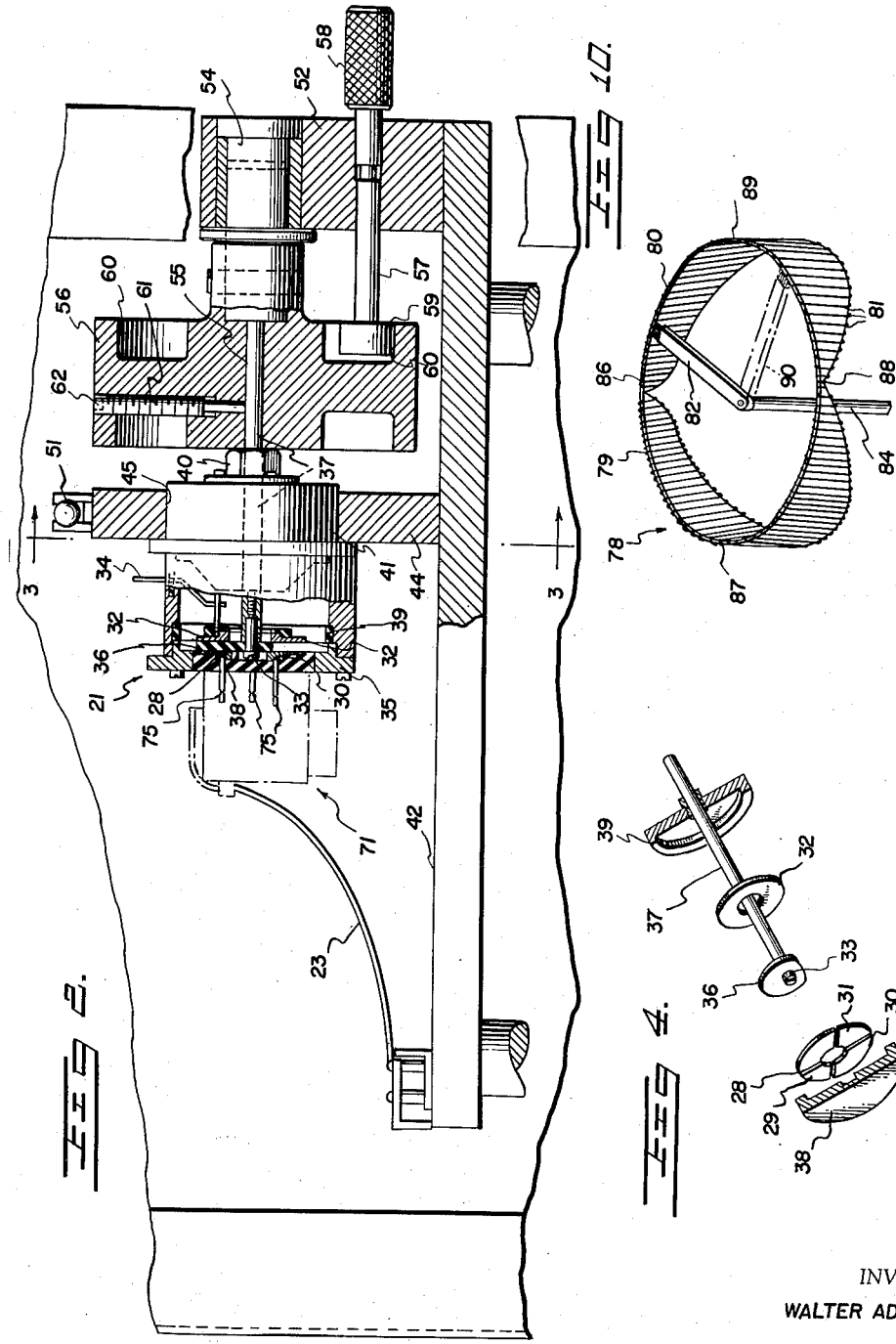
INVENTOR
WALTER ADAMS.
BY
ATTORNEY

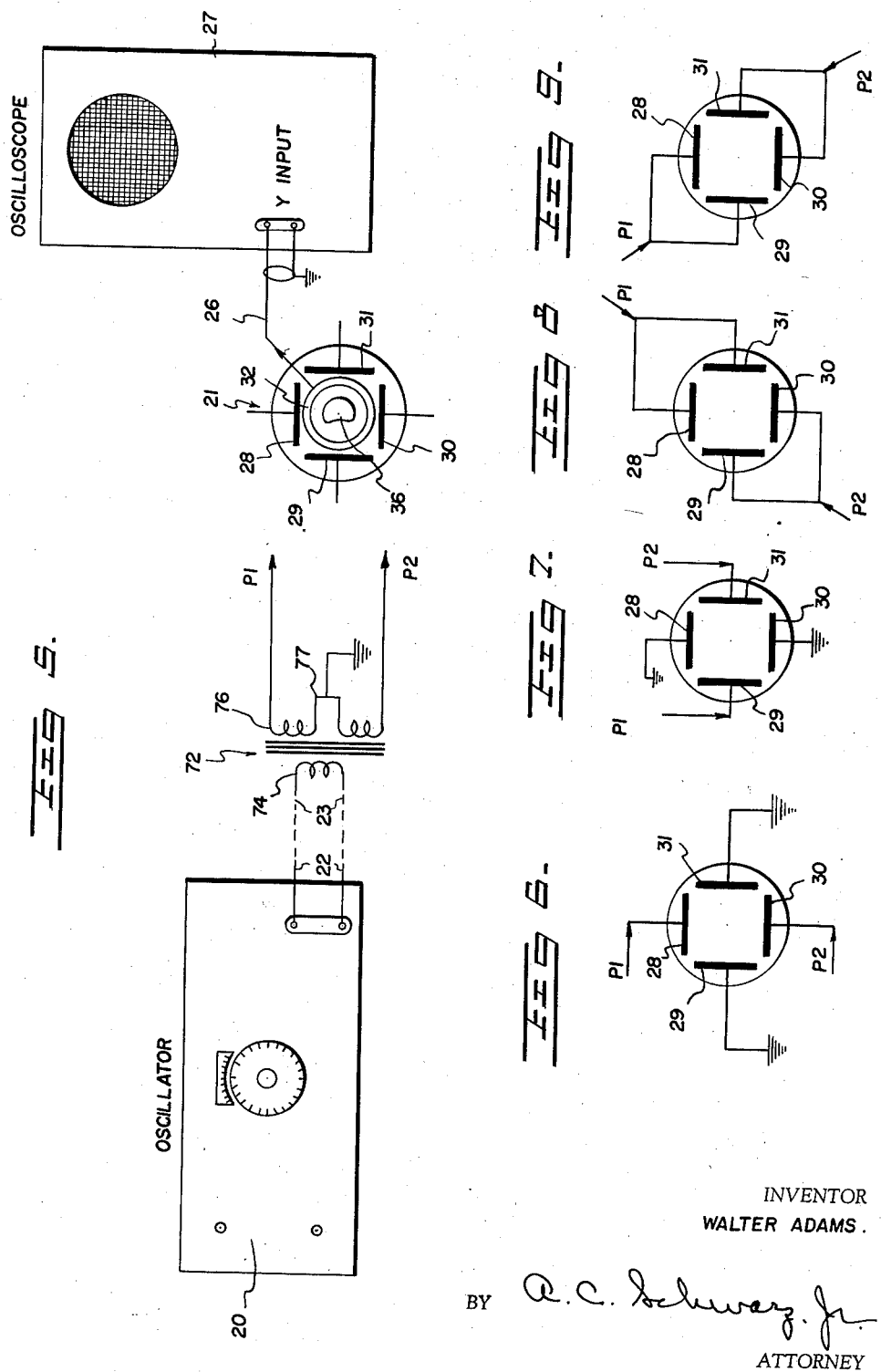

United States Patent Office 2,840,784
Patented June 24, 1958

2,840,784

METHOD OF TESTING ELECTRICAL DEVICES

Walter Adams, Chapel Hill, N. C., assignor to Western Electric Company, Incorporated, New York, N. Y., a corporation of New York Application December 1, 1953, Serial No. 395,496

8 Claims. (Cl. 324—158)

This invention relates to the testing of electrical devices and more particularly to the testing of phase capacitors and potentiometers having a continuous winding which is tapped at various points along the winding.

A phase capacitor is a well known component in the electrical art and is very often used where a voltage of a variable phase is desired, and is, in fact, sometimes referred to as a phase-shifting apparatus. A common type of phase capacitor has four quadrature plates of equal area arranged in orthogonal relationship in one plane and a fifth plate having an area equal to the total area of the four plates and in a plane parallel to the four plates. Disposed between the four plates and the fifth plate is a rotor of a dielectric material. The capacitor plates and dielectric rotor are enclosed within a housing for protection. In effect, the phase capacitor consists of four capacitors which have a common plate and the capacitance of each depends on the position of the rotating dielectric. If the dielectric rotor is positioned totally between a first of the four quadrature plates and the fifth plate, then the capacitances of the capacitors formed by the remaining three quadrature plates and the fifth plate are negligible compared to that of the first since air which has a relatively low dielectric constant compared to that of the dielectric rotor is the medium between the remaining three plates and the common fifth plate.

When it is desired to use the phase capacitor as a phase shifter, four voltages of equal magnitude and of quadrature phase relationship are applied to the four orthogonally- positioned or quadrature plates and an output is taken from the common fifth plate. The output voltage taken from the fifth plate will have a constant amplitude and its phase depends upon the position of the dielectric rotor. For example, if the rotor is positioned totally adjacent a quadrature plate to which a voltage having a phase of zero degrees is applied, then the voltage at the output will have a phase of zero degrees since any energy coupled to the fifth or output plate from the plates having voltages thereon of 90, 180, and 270 degrees phase relationship will be negligible.

It is then obvious that if the rotor were rotated at a constant speed, the voltage appearing at the output would be of constant amplitude and of a phase which is continually varying at a constant rate, such rate being the same as the speed of the rotor.

A phase shifter of this type is generally used in the range unit of a radar set to provide the shifting of phase (or position) of a train of sine waves which are later converted into a train of sharp pulses or "markers." One of these markers is then selected in a selector circuit and used as a range indicating marker. The position of this range marker can be controlled by the position of the phase capacitor rotor, and by mechanically gearing the rotor to the range servo motors, the range marker can be made to indicate range to a target by virtue of its position on the radar screen.

It can be seen from the description above that the accuracy of the phase shifting is dependent on the mechanical construction of the phase capacitor. Heretofore the only test of the phase capacitor has been a check of the mechanical dimensions, and this has been both difficult and inadequate because of the extremely close tolerances to which the phase capacitors have been constructed. Furthermore, it is impossible to check to the required accuracies the physical position of the phase capacitor elements after they have been enclosed with the housing.

Accordingly, one object of the present invention is to provide a method of testing a phase capacitor.

Another object is to provide a method of electrically testing a phase capacitor for accuracy of mechanical construction, which electrical test does not take the place of a mechanical check but serves as an additional test to provide a final, highly accurate check determining the actual electrical performance characteristics of the phase capacitor.

With these and other objects in view, the invention comprises the steps of securing the phase capacitor, providing means to manually rotate the dielectric rotor, and providing scale means to indicate the position of the rotor. To a first two opposite quadrature plates of the phase capacitor are applied two voltages of equal amplitude and opposite phase. The remaining second two opposite quadrature plates are placed at a reference potential, for example, ground potential although the grounding of the second two plates is not necessary. The common fifth plate of the phase capacitor is connected to the vertical amplifier (Y-axis) of an oscilloscope or any other suitable indicating device.

The dielectric rotor is then rotated until two minimum voltages are observed on the oscilloscope, which minimum points will occur when the rotor lies adjacent the two grounded quadrature plates and should be 180 degrees apart as indicated on the scale means which is directly attached to the rotor.

The first opposite quadrature plates are then placed at ground potential and the second opposite plates are energized with the source of equal amplitude voltages of opposite phase.

The rotor is again rotated, and two more minimum voltage points are observed on the oscilloscope and the position of the rotor on the scale is again observed.

Adjacent quadrature plates are then connected together and energized by the 180 degrees out-of-phase voltage. Using the same procedure, four more minimum voltage points can be observed on the oscilloscope and the position of the rotor for each on the scale.

There are then eight points of minimum voltage, and if the phase capacitor is of perfect construction, the eight noted positions of the rotor should be 45 degrees apart.

The above method of testing phase capacitors can also be used to test certain other types of electrical components. One type that may be tested by the method of the present invention are card-type potentiometers which consist of resistance wire wound on a flat card. The card is then bent into a ring and mounted on a cylindrical body so that a wiper contact can be rotated over the turns of the wire on the edge of the upright cylindrical card. These potentiometers may be wound linearly or as sine or cosine functions, the particular characteristics depending on the shape of the card support.

In some apparatus, such as electronic computers, it is necessary to have a wire-wound card-type potentiometer which has one winding divided into four equal sections with a tap point at each section, which tap points are positioned at quadrature points around the ring-shaped card if the potentiometer is correctly constructed. This type of potentiometer may have a single wiper contact or, as required in some apparatus, two wiper contacts positioned 90 degrees and insulated from one another.

A further object of this invention is to electrically test the potentiometers of the type described above to determine the accuracy of the mechanical construction thereof.

With this further object in view, the voltages of equal magnitude but opposite phase are applied to two opposite tap points. One wiper contact is electrically connected to an indicating device such as an oscilloscope and a shaft that drives the wiper contact has attached thereto a scale to indicate the angular position of the contact. The same procedure is followed as described above in the testing of the phase capacitor and two minimum points are noted on the oscilloscope and the position of wiper contact is noted on the scale. The two points of minimum voltage will occur when the wiper contact is touching the two remaining tap points to which no voltage is applied if the potentiometer is of correct construction. With the voltages connected to the two remaining tap points, two more wiper contact positions are noted. These four positions should be displaced by 90 degrees if the potentiometer is correctly constructed.

If a potentiometer of the above type having two wiper contacts displaced by 90 degrees is to be tested, the above procedure is undergone for the second contact and the four positions recorded should be displaced by 90 degrees from those of the first wiper contact if the potentiometer is correctly constructed.

Other objects and advantages will become apparent from the following detailed description when considered in conjunction with the accompanying drawings wherein:

Fig. 1 illustrates a complete test set that may be used for the present invention with a phase capacitor shown secured in position for testing;

Fig. 2 illustrates an enlarged view, shown partially in section, of the component-securing means with a phase capacitor shown secured in place;

Fig. 3 is a sectional view taken along the line 3—3 of Fig. 2;

Fig. 4 is an exploded view of the phase capacitor shown without the casing;

Fig. 5 shows the circuit connections used in the present invention for the testing of a phase capacitor;

Figs. 6 to 9 illustrate various phase capacitor connections used in the method of testing in accordance with the present invention; and Fig. 10 shows a card-type wire-wound potentiometer which may be tested by the present invention.

Referring now to the drawings, wherein like reference numerals indicate the same elements throughout the several views, the method of testing electrical components by the present invention may be accomplished by the apparatus of Figs. 1 to 3. It is to be understood that many other types of apparatus or components can be used to accomplish the present method of testing and the apparatus per se is not claimed in the instant application but merely disclosed for the purpose of illustration.

In Fig. 1 the reference numeral 20 designates an oscillator which is used to energize the electrical component to be tested. For purposes of illustration, a phase capacitor 21 is shown in the testing position and is energized by the oscillator 20 through conductors 22 and 23. The output of the phase capacitor 21 is connected through a connector 24 and a conductor 26 to an indicating apparatus such as a cathode ray oscilloscope shown at 27.

The phase capacitor 21 to be tested is shown in Figs. 2 and 4 and comprises four orthogonally-positioned quadrature plates 28, 29, 30, and 31. The partial section of the phase capacitor illustrated in Fig. 2 is taken along the axis thereof for the sake of clarification and hence only cross sectional views of the plates 28 and 30 will be seen in this view.

Reference numeral 32 designates a fifth plate of the phase capacitor, which fifth plate is a common condenser plate to the four quadrature plates 28 to 31 and is of an area equal to the total area of the quadrature plates 28 to 31. The fifth plate 32 may be termed a collector ring since plate 32 is connected to the oscilloscope 27 through the terminal 34, connector 24, and conductor 26.

Positioned between the four quadrature plates 28 to 31 and the plate 32 is a cardioid-shaped rotor 36 which is made of a dielectric material such as bonded mica, and which is eccentrically mounted on a shaft 37 and retained thereon by a screw 33. The rotor 36 is of such dimensions that when it is positioned adjacent any one of the quadrature plates 28 to 31, it covers approximately the area of the quadrature plate. For example, if the rotor 36 is adjacent quadrature plate 28, then the value of capacitance formed by the condenser having plates 28 and 32 with dielectric 36 therebetween is very much greater than the capacitance of the condensers formed by the other three quadrature plates 29, 30, and 31 with plate 32, which other condensers have air as a dielectric.

In the manufacture of the phase capacitor, the quadrature plates 28 to 31 are molded in an end disk 38 of insulating material, and the collector ring 32 is likewise molded in an insulating disk 39. The structure of Fig. 4, that is, the disk 38, the quadrature plates 28 and 31, the rotor 36, the collector ring 32, the disk 39, and the shaft 37 are then placed in a housing 35 as shown in Fig. 2 with the shaft 37 protruding therefrom to the right as viewed in Fig. 2. A nut 40 retains the various elements of the phase capacitor together and is rotatable with the shaft 37. A portion 41 of the housing 35 acts as a bearing in which the shaft 37 is rotatably mounted.

The phase capacitor securing means illustrated in the lower portion of Fig. 1 is shown in greater detail in Figs. 2 and 3. The securing means comprises a base plate 42 on which is mounted a vertical plate 44 which has a circular aperture at 45 and is bifurcated as shown at 46 and 47. An eye bolt 48, threaded on its lower end, is inserted through the portion 46 of the plate 44 and threaded into portion 47 as shown in Fig. 3. Around the eye bolt 48 and between the portions 46 and 47 is positioned a helical spring 49 which tends to force the portions 46 and 47 apart. A double cam 50 to which a handle 51 is attached is pivotally mounted to the upper or loop portion of the eye bolt 48 by a pin 53. With the cam 50 and handle 51 in the position shown in Fig. 3, the portions 46 and 47 are forced together against the action of the spring 49 to decrease the size of aperture 45 and firmly secure the portion 41 of the phase capacitor 21 when the capacitor is to be tested. To insert or release the phase capacitor 21 from the testing position, the cam 50 is rotated counterclockwise as viewed in Fig. 3 by the handle 51 to a position approximately 180 degrees from the position shown in Fig. 3. This increases the size of the aperture 45 so that the portion 41 of the phase capacitor 21 is movable therein.

The base plate 42 is secured to a standard 52 which is a part of the cabinet housing the test set. A shaft 54 is rotatably mounted within the standard 52 and has attached to one end a cylindrical drum 56 having an axial bore 55. Another shaft 57 is also rotatably secured within standard 52 and has a knurled knob 58 attached to one end and a friction wheel 59 secured to the other end. The friction wheel 59 is adapted to contact an inside surface 60 of the drum 56 so that the drum 56 can be rotated when the knob 58 is manually turned.

Positioned within a threaded bore 61 in the drum 56 is a cap screw 62 which is adapted to abut the side of the shaft 57 of the phase capacitor 21 to secure the shaft and hence the dielectric rotor 36 to the drum 56.

A scale 64 (Fig. 1), having graduations of one degree, is provided on the external surface of drum 56 to cooperate with a vernier scale 66 which is provided on a arcuate portion 67 of a plate which also has a straight portion 68, which straight portion 68 is secured to the vertical plate 44 by screws 69 and 70.

As stated above, electrical energy is applied to the quadrature plates 28 to 31 from oscillator 20 through conductors 22 and 23. Conductors 23 is connected to an adapter 71 which houses a transformer 72 shown schematically in Fig. 5. Transformer 72 has a primary winding 74 which is connected to conductors 23 and a secondary winding 76 which is center tapped to ground as shown at 77. Ground optential is, of course, merely a reference potential and may be taken as the potential of the chassis of the oscillator and oscilloscope. Since the secondary 76 of the transformer 72 is center-tapped to ground, the potentials $P_1$ and $P_2$ (Fig. 5) will be of equal amplitude and out of phase by 180 degrees.

The secondary voltages $P_1$ and $P_2$ are applied to opposite quadrature plates, for example, 28 and 30 through terminals 75 (Fig. 2) by means of the adapter 71 which also grounds the remaining two opposite quadrature plates 29 and 31. The remaining plates 29 and 31 do not necessarily have to be grounded as will be explained below. The adapter 71 can also be arranged to connect together adjacent quadrature plates, as 28 and 29 or 30 and 31.

To the right in Fig. 5 is shown a schematic representation of the phase capacitor 21 with the quadrature plates 28 to 31, the rotor 36 eccentrically mounted on the shaft 37, and the collector ring 32 connected by way of conductor 26 to the vertical amplifiers or "Y-input" of oscilloscope 27.

Fig. 10 illustrates a potentiometer 78 of the type which may be tested by the hereinafter described method, which potentiometer 78 is shown without the housing in which it is enclosed for protection.

The potentiometer 78 comprises two card supports 79 and 80 which are bent to shape a ring and around which one continuous winding of resistance wire 81 is wound. The shapes of the supports 79 and 80 determine the electrical characteristics of the potentiometer and they may be used to multiply or divide linear, sine, or cosine functions in various electronic computers or other apparatus.

The upper surface of the ring formed by the two supports 79 and 80 is in the shape of a circle and in one plane so that a contact arm or wiper contact 82 which is secured to, rotated by, and insulated from a shaft 84 may ride over the upper surface and electrically connect various desired points of winding 81 to the contact arm 82.

The winding 81 of potentiometer 78 is divided into four quadrature sections by tap points 86 to 89 and each tap point 86 to 89, if the potentiometer 78 is correctly constructed, should be displaced by 90 degrees around the upper surface of the ring formed by the card supports 79 and 80.

A second type of potentiometer that may be tested by the present invention is a type having a second wiper contact as shown in dotted lines at 90 in Fig. 10. This second wiper contact is insulated from the first wiper contact 82 and from the shaft 84, and if this type of potentiometer is correctly constructed the two contact arms 82 and 90 should be angularly displaced from one another by 90 degrees.

The procedure used in the method of testing phase capacitors by the present invention will now be described.

To secure the phase capacitor in position for testing, the portion 41 of the phase capacitor 21 is inserted within the aperture 45 of the vertical plate 44 with the cam 50 and handle 51 in a position displaced by 180 degrees from the position shown in Figs. 1 to 3. When this is done the shaft 37 enters the axial bore 55 of the drum 56 and is firmly secured to the drum 56 by turning down cap screw 62 onto the side of the shaft 37. The shaft 37 may have a keyway thereon to cooperate with a guideway in the axial bore 55 of drum 56 or any other suitable means, the important feature being that the angular position of the eccentrically mounted rotor 36 will be known with respect to the scale 64 on the drum 56.

The handle 51 is then rotated in a clockwise direction to approximately the position shown in Fig. 3, so that the cam 50 forces the portions 46 and 47 of the plate 44 together to firmly secure the portion 41 of the phase capacitor 21 in place for testing.

The oscillator 20 is then energized. This oscillator 20 may produce energy, to use an example, in the form of a sine wave at a frequency of 82 kilocycles per second.

With the collector ring 32 connected to the vertical amplifiers of the oscilloscope 27 through the terminal 34, connector 24, and conductor 26, the following steps are performed:

Referring to Fig. 6, the potential $P_1$ is applied to the quadrature plate 28 of the phase capacitor 21 and potential $P_2$ to the quadrature plate 30. Quadrature plates 29 and 31 are placed at ground potential by means of the adaptor 71. The knob 58 is then manually rotated so that both the drum 56 and the rotor 36 are rotated together. When the rotor 36 lies adjacent plates 29 and 31, minimum indications of output voltage from the collector ring 32 will appear on the oscilloscope. Assuming that one of these minimum points occurs when the rotor 36 lies adjacent plate 29 and assuming that the reading on the scale 64 and associated vernier 66 for this condition is zero degrees, then the scale reading should be 180 degrees when the rotor 36 lies adjacent plate 31.

When the rotor 36 lies adjacent plates 28 and 30, voltage maximum points will occur on the oscilloscope 27. These voltage maximum points should be 180 degrees apart also if the phase condenser is correctly constructed; however, it has been found that these maximums are much too broad to provide an accurate angular reading. Voltage minimums are very sharp and thus provide more precise angular readings, especially if observed on the oscilloscope at the point where the sine wave amplitude is reduced to a straight line.

Circuit connections are then made as illustrated in Fig. 7, that is, potential $P_1$ is applied to the plate 29 and potential $P_2$ to the plate 31 with plates 28 and 30 placed at ground potential. The rotor 36 and scale 64 assembly are again rotated by manually turning knob 58 and two more minimum voltages will be indicated on the oscilloscope 27 when the rotor 36 lies adjacent plates 28 and 30 and the scale 64 will have readings of 90 degrees and 270 degrees, respectively, if the phase capacitor is of correct construction.

In the two steps described above, the potentials $P_1$ and $P_2$ were applied to two of the quadrature plates 28 to 31 and the remaining two quadrature plates were placed at ground potential. It is not necessary to ground the remaining quadrature plates from a theoretical standpoint and the method of the present invention could be performed without the grounding of these plates. However, since there is a possibility that some stray capacitance might be introduced under certain circumstances to give slightly erroneous readings of the angular position of the dielectric rotor 36, these plates should be placed at ground potential to eliminate this possibility.

Referring to Fig. 8 the adjacent quadrature plates 28 and 31 are then connected together and to the potential $P_1$ and the adjacent plates 29 and 30 are connected together and to the potential $P_2$. When the rotor is actuated by turning knob 58, two minimum voltage points will occur when the rotor lies half-way between plates 28 and 29 and halfway between plates 30 and 31, and the scale 64 will read 45 degrees and 225 degrees, respectively, if the capacitor is of correct construction.

The final step of the condenser test is shown in Fig. 9. The plates 28 and 29 are connected together and to potential $P_1$, and plates 30 and 31 are connected together and to the potential $P_2$. The motor 36 is again rotated by means of the knob 58 and minimum voltage points will be indicated on the oscilloscope 27 when the rotor 36 lies halfway between the plates 28 and 31 where the scale 64 should read 135 degrees and halfway between plates 29 and 30 where the scale 64 should read 315 degrees.

By the above method, eight nulls or minimum readings are obtained which should be, for a perfect phase capacitor, 45 degrees apart, viz., 0, 45, 90, 135, 180, 225, 270, and 315 degrees. Since very few phase capacitors are of perfect construction, using any one of the null or minimum voltage points as a reference, the angular error from the nominal value at each of the other seven points may be observed, the direction of the error being noted as either plus or minus.

For example, if the phase capacitor is used in the range unit of a radar set as discussed above and the maximum phase capacitor error is not to exceed a plus or minus five yards of radar range, then the total spread of angular error (that is, the difference between maximum positive and maximum negative error), should not exceed one degree and forty-five minutes with the oscillator 20 providing energy at 82 kilocycles.

In order to test the mechanical construction of a potentiometer having a single wiper contact as shown at 82 in Fig. 10, the shaft 84 of the potentiometer 78 is inserted in axial bore 55 of the drum 56 and secured therein by the cap screw 62 in a similar manner that the shaft 37 of the phase capacitor 21 was secured. It is assumed that again there is provided a keyway in the shaft 84 to cooperate with a guideway in the axial bore 55 of the drum 56 or other suitable means so that the angular position of the wiper contact with respect to the scale 64 is known.

The wiper contact 82 is then electrically connected by any suitable means to the Y-input connection of the oscilloscope 27 and the oscillator 20 is energized to develop across the secondary 76 of the transformer 72 the two out-of-phase potentials $P_1$ and $P_2$. Potential $P_1$ is then connected to the tap point 86 and potential $P_2$ to the tap point 88. Unlike the testing of the phase capacitor 21, the remaining points 87 and 89 are not grounded. The drum 56 and the wiper contact 82 are rotated by manually turning the knob 58 and minimum points or nulls will appear on the oscilloscope 27 when the wiper contact 82 is contacting point 87 and point 89 if the potentiometer is properly constructed. Assuming that the reading of the scale 64 is zero degrees when the wiper contact 82 is touching point 87, then the scale 64 should read 180 degrees when the wiper contact 82 is touching point 89 if the potentiometer is of correct construction.

The potential $P_1$ is then applied to point 87 and the potential $P_2$ to point 89. The wiper contact 82 is again rotated and two null points will occur when the contact 82 is touching points 86 and 88 and scale 64 will indicate 90 and 270 degrees, respectively, if the potentiometer 78 is of correct construction.

There have been acquired, then, four angular readings from the scale 64 which indicate the positions of the tap points 86 to 89. If the potentiometer 78 is of perfect construction, these angular readings will be spaced by 90 degrees. In the case of an imperfect potentiometer, the amount of angular error that can be tolerated and still render the potentiometer acceptable can be easily predetermined.

If the accuracy of the mechanical construction of a potentiometer 78, which has two wiper contacts 82 and 90 (Fig. 10), which are electrically insulated from each other and which should be displaced by 90 degrees, is to be determined, then the same procedure as hereinbefore described for a single contact 82 is undergone with the wiper contact 82 connected to the oscilloscope 27. The wiper contact 82 is then disconnected from the oscilloscope and the wiper contact 90 connected thereto. The identical procedure as described above for the wiper contact 82 is again undergone with the wiper contact 90 connected to the oscilloscope. The four readings of scale 64 for each contact 82 and 90 should be displaced by 90 degrees if the wiper contacts are truly displaced by this amount. Hence, the mechanical construction of this second type of potentiometer can be checked by the method of the present invention.

It is to be understood that the above-described embodiment is merely illustrative of the invention and that many modifications may be devised by those skilled in the art to which the invention pertains, and the exclusive right of all such modifications as come within the scope of the appended claims is contemplated.

What is claimed is:

1. A method of testing electrical devices which have four fixed quadrature members and a rotatable member to determine the mechanical construction thereof, comprising the steps of connecting voltages which are equal in magnitude and in phase opposition to a first two opposed quadrature members, connecting an output of said device to an indicating apparatus, rotating the rotatable member until two null points are indicated on said indicating apparatus, determining the angular displacement between the null points by noting the location of said rotatable member when the null points occur, connecting the voltages to a second two opposed quadrature members, again rotating the rotatable member until two more null points are indicated on the indicating means, and noting the angular position of said rotatable member when these second null points occur.

2. A method of testing electrical devices of the type having a plurality of fixed electrical members positioned radially in one plane and a rotating member, comprising the steps of securing the device, applying voltages which are equal in magnitude and in phase opposition to alternate fixed members, connecting any electrical energy output from said fixed members to an electrical indicating apparatus, rotating said rotatable member until a plurality of reference points are observed on said indicating apparatus, and measuring the angular position of the rotatable member when the reference points are observed.

3. A method of electrically testing the mechanical construction of phase capacitors of the type having four orthogonally-positioned quadrature capacitor plates, a fifth capacitor plate which is a common capacitor plate to said four quadrature plates, and a dielectric rotor adapted to rotate between each of the quadrature plates and the common plate, comprising the steps of securing the phase capacitor, connecting the fifth plate to a voltage indicating apparatus, performing the successive steps of applying two voltages of equal magnitude and 180 degrees phase opposition to a first two opposite quadrature plates, grounding a second two opposite quadrature plates, applying the 180 degrees-out-of-phase voltages to the second two opposite plates and grounding the first two opposite plates, connecting together a first pair of adjacent quadrature plates and a second pair of adjacent quadrature plates, applying the 180 degrees-out-of-phase voltages across said first and second pairs of adjacently-connected plates, connecting together a third pair of adjacent quadrature plates and a fourth pair of adjacent quadrature plates, applying the 180 degrees-out-of-phase voltages across said third and fourth pairs of adjacently-connected plates, rotating the dielectric rotor until two voltage minimum points are observed on the voltage indicating apparatus for each of the successive connections, and measuring the angular position of the dielectric rotor for each observed minimum voltage point.

4. A method of testing potentiometers of the type having a continuous winding wound on a circular form with four tapped connections at quadrature points around the circular winding and a wiper contact adapted to rotate over the continuous winding, comprising the steps of applying voltages which are equal in magnitude and in phase opposition across two opposing quadrature points, electrically connecting the wiper contact to a voltage indicating apparatus, rotating the wiper contact until two predetermined indications are observed on the voltage indicating apparatus, and measuring the angular position of the wiper contact when the predetermined indications are observed.

5. A method of testing electrical devices which have four fixed quadrature members and a rotatable member to determine the mechanical construction thereof, comprising the steps of connecting voltages which are equal in magnitude and in phase opposition to a first two opposed quadrature members, connecting the second two opposed quadrature members to a predetermined potential, connecting an output of said device to an indicating apparatus, rotating the rotatable member until two null points are indicated on said indicating apparatus, determining the angular displacement of said rotatable member when the null points occur, reversing the connections on the said two pairs of quadrature members, again rotating the rotatable member until two more null points are indicated on the indicating apparatus, and noting the angular position of said rotatable member when these second null points occur.

6. A method of electrically testing the mechanical construction of electrical devices of the type having four fixed quadrature members and a rotatable member, comprising the steps of securing the device, connecting voltages which are equal in magnitude and in phase opposition to a first two alternate quadrature members, connecting a second two alternate quadrature members to a predetermined potential, connecting an output of said device to an electrical indicating apparatus, rotating the rotatable member until two reference points are observed on said indicating apparatus, measuring the angular position of the rotatable member when the two reference points are observed, reversing the connections to the said two pairs of alternate quadrature members, again rotating the rotatable member until two more reference points are observed on said indicating apparatus, and again measuring the angular position of the rotatable member when the second two reference points are observed.

7. A method of testing electrical devices that have a plurality of fixed electrical members positioned radially in one plane and a rotatable member, comprising the steps of connecting a first group of alternate fixed members to voltages which are equal in magnitude and in phase opposition, connecting the second group of remaining alternate fixed members to predetermined potentials, connecting the voltage output from said fixed members to a voltage indicating apparatus, rotating said rotatable member until a plurality of reference voltage indications are observed on said indicating apparatus, measuring the angular position of the rotatable member when the reference voltage indications are observed on said indicating apparatus, reversing the connections of said two groups of alternate fixed members, rotating the rotatable member until another plurality of reference voltage indications are observed on said indicating apparatus, and measuring the angular position of the rotatable member when the second plurality of reference voltage indications are observed on said indicating apparatus.

8. A method of testing electrical devices of the type having a plurality of fixed electrical members positioned radially in one plane and a rotating member, comprising the steps of securing the device, applying voltages which are equal in magnitude and in phase opposition to alternate fixed members, placing the remaining alternate fixed members at a predetermined potential, connecting any electrical energy output from said fixed members to an electrical indicating apparatus, rotating said rotatable member until a plurality of reference points are observed on said indicating apparatus, and measuring the angular position of the rotatable member when the reference points are observed.

References Cited in the file of this patent
UNITED STATES PATENTS
2,622,127    Alsberg _____ Dec. 16, 1952

OTHER REFERENCES

Dibble: Abstract of application Serial No. 666,030, published Nov. 15, 1949, 628 O. G. 888.